US008811774B1

United States Patent
Chen et al.

(10) Patent No.: US 8,811,774 B1
(45) Date of Patent: Aug. 19, 2014

(54) SUPER RESOLUTION USING AN INTERPRETIVE SCALER

(75) Inventors: Junhua Chen, Shanghai (CN); Neil D. Woodall, Newport Beach, CA (US); Bob Zhang, Santa Clara, CA (US)

(73) Assignee: Pixelworks, Inc., Portland, OR (US)

( * ) Notice: Subject to any disclaimer, the term of this patent is extended or adjusted under 35 U.S.C. 154(b) by 118 days.

(21) Appl. No.: 13/354,265

(22) Filed: Jan. 19, 2012

(51) Int. Cl.
*G06K 9/32* (2006.01)

(52) U.S. Cl.
USPC ........................................... 382/300

(58) Field of Classification Search
USPC ................. 348/333.11, E7.012, E11.013; 375/E7.188, E7.248; 382/299, 300
See application file for complete search history.

(56) References Cited

U.S. PATENT DOCUMENTS

| | | | | |
|---|---|---|---|---|
| 6,201,880 | B1 * | 3/2001 | Elbaum et al. | 382/100 |
| 2008/0298639 | A1 * | 12/2008 | Tsunekawa et al. | 382/107 |
| 2009/0079876 | A1 * | 3/2009 | Takeshima et al. | 348/699 |
| 2010/0149338 | A1 * | 6/2010 | Aggarwal et al. | 348/159 |
| 2012/0155550 | A1 * | 6/2012 | Wu et al. | 375/240.25 |

* cited by examiner

*Primary Examiner* — Gregory F Cunningham
(74) *Attorney, Agent, or Firm* — Marger Johnson & McCollom PC

(57) ABSTRACT

A method of generating an initial high resolution frame includes receiving at least two low resolution frames of an image at a processor, wherein the low resolution frames have a resolution lower than the high resolution frame, using one or more low resolution frames to interpolate a high resolution frame using an interpretive scaler, wherein the interpolation adapts to the contours of the image, and using the initial high resolution frame and the low resolution frame in an iterative super resolution process.

8 Claims, 4 Drawing Sheets

SUPER RESOLUTION USING AN INTERPRETIVE SCALER

Super resolution processes generally merge information from several low resolution image frames to develop a high resolution frame. The process then uses the high resolution frame to generate synthesized low resolution frames using an imaging model. A comparison of the original or input low resolution frames and the synthesized low resolution frames generates an error. The process then uses the error to adjust the high resolution image to minimize the error.

The process of minimizing the error may be referred to as convergence, as the synthesized low resolution frames converge on the input low resolution frames. This indicates that the high resolution frame derived from the low resolution frames has high accuracy.

Using a better initial estimate of the high resolution image increases the speed of the convergence. This reduces the number of iterations. Regardless of the number of iterations, a poor estimate of the high resolution image may cause the super resolution process to converge on the wrong result.

If the scenes in the low resolution frames contains little motion or very complex motion, the motion estimation may fail to find a meaningful match for the current frame, the final resulting high resolution frame will be close or identical to the initial estimate. A better initial estimate leads to a better high resolution result and makes up an important part of the super resolution process.

Current approaches use a one-dimensional (1D) scaler to reach the initial estimated high resolution frame. These types of scalers may be referred to as non-adaptive or non-interpretive scalers, as they do not typically take into account local information with an image. Examples of 1D scalers include bilinear interpolation, bicubic interpolation, polyphase interpolation, Lanczos interpolation, etc. The results will generally contain 'jaggies' or stepped artifacts around slanted edges, resulting in a relatively poor estimate of the high resolution frame used in the super resolution process.

DETAILED DESCRIPTION OF THE EMBODIMENTS

Figure 1:
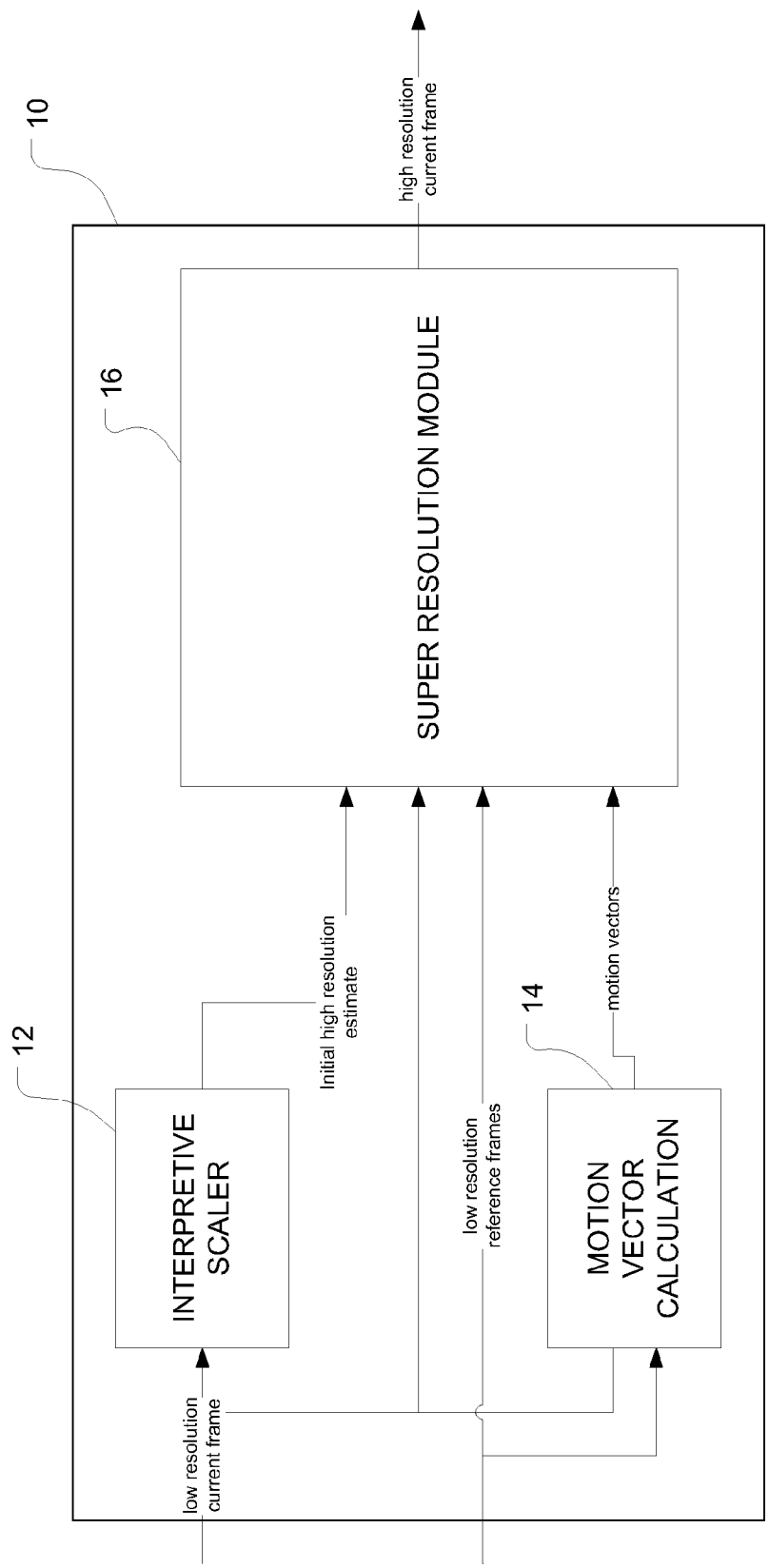
FIG. 1 shows an embodiment of a video post processor.

FIG. 1 shows an embodiment of a video post processor configured to perform super resolution processing. In this embodiment, the video post processor 10 receives as inputs the current low resolution frame and the low resolution reference frames. The terms 'low resolution' and 'high resolution' as used here are relative to each other, the high resolution frame is of higher resolution than the low resolution frame and the reverse. The low resolution reference frames will typically be stored and accessed as needed based upon the current frame.

The motion vector calculation module 14 uses the current frame and the reference frames to perform motion vector calculations. This will produce motion vectors for the current frame that will predict motion, allowing the super resolution module 16 to correctly depict moving objects in the high resolution frame.

The high resolution frame results from an iterative process performed by the super resolution module 16. The process takes the estimated high resolution frame from the interpretive scaler 12 and synthesizes low resolution frames from it. These are then compared to the original low resolution 'reference' frames.

The differences between the original and synthesized frames results in an error measurement. The module then applies the error measurement to the estimated high resolution frame to generate a new high resolution frame. This completes one iteration. After the first iteration, the module provides its own estimated high resolution frame and the process can be repeated. Once the error becomes low enough indicating that the synthesized low resolution frames accurately match the original frames, the estimated high resolution frame becomes the output high resolution frame. This process may be referred to as convergence. The fewer times the iterations need to run, the faster the convergence. The less error measurement, the better the output high resolution image quality. A better initial estimate not only speeds convergence but also improves the final output image quality. Ideally taking the true high resolution image as initial estimate will result in zero error if motion between low resolution frames are correctly calculated and noise is ignored.

The interpretive scaler 12 generates the initial estimated high resolution frame. The discussion here refers to the scaler 12 as an 'interpretive' scaler because it scales the image data based upon an interpretation of the local image content. Typically, super resolution processes rely upon one-dimensional, or 'non-interpretive' scalers.

Non-interpretive scalers include such scaling processes as bilinear interpolation, bicubic interpolation, polyphase interpolation, Lanczos interpolation, etc. Interpretive scalers include such approaches bandelet, kernel regression and gradient methods, etc. As will be discussed in more detail further with regard to FIG. 2, one embodiment employs gradients.

Figure 2:
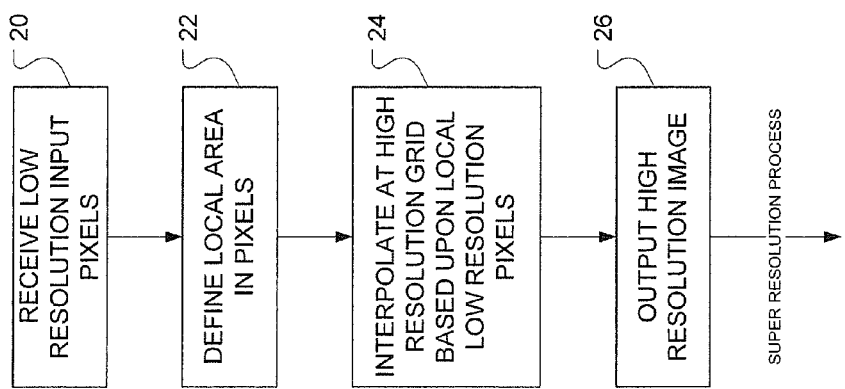
FIG. 2 shows a flowchart of an embodiment of a method of generating a high resolution image frame.

FIG. 2 shows an embodiment of interpretive scaling of a low resolution frame to generate a high resolution frame. At 20, the low resolution input frames are received with their individual pixels. At 22, the process defines some set of pixels as the local area to the current pixel. At 24, the process interpolates new pixels from the low resolution pixels in the local area. In this embodiment, the new pixels are interpolated into a high resolution grid along the direction estimated from local low resolution pixels. The interpolative scaler usually generates a better high resolution image estimate.

Using an interpretive scaler has several advantages that are not immediately apparent. Generally, the motion estimation for super resolution occurs between the low resolution images, so improving the initial estimate for the high resolution image has no impact on the motion estimation between the low resolution frames. This carries through, as approaches for adapting motion estimation for super resolution, such as that used in co-pending patent application, "Super Resolution Weighting Blending," U.S. patent application Ser. No. 13/303,660, depend upon the estimated quality of the motion vectors estimated between the low resolution images.

In the super resolution iteration process, synthesized low resolution frames are generated from a high resolution estimate by motion compensation and downsampling. In some applications the synthesized low resolution frames are used to help to judge the quality of the motion vectors estimated from the low resolution images. Having a more accurate initial estimate produces lower error for the motion vectors, reducing the iterations and reducing the costs.

Since the super resolution process relies upon estimates of motion, it has imperfections. Several types of motion may exist in the images that make it difficult to provide high quality motion vector that is accurate for a group of pixels, such as blocks. An initial estimate of higher accuracy results in a higher quality high resolution image because when the super resolution process fails, the difference between the actual high resolution image and the produced high resolution image is not as big.

Interpretive and non-interpretive scalers will not create the additional frequencies that existed in the high frequency image and not in the low frequency input image. The scalers do not replace the super resolution process. Therefore, it would seem that the choice of scaler would not have an impact. Similarly, both types of upscalers will create harmonics or aliasing frequencies, or require an extreme low pass filter.

Polyphase scalers can be configured such that they can represent any of the non-interpretive scalers by the appropriate choice of the number of taps and coefficients. The polyphase filter scaling ratio M/N can be implemented by first inserting M-1 zeros between existing samples, lowpass filtering and then downsampling by dropping N-1 samples. The process of inserting zeros in between existing samples creates harmonics of the input signals. The lowpass filter and downsampling can not eliminate all of the harmonics and these are either aliased or passed unchanged into the output, creating a jaggy type of artifact along edges. The more extreme the lowpass filter (more taps and/or lower passband), the more the harmonics are reduced before downsampling. However, the tradeoff is either a very soft image or more ringing on the edges, both of which are undesirable.

Interpretive scalers analyze the image to find a local area where the high frequency content of the image is reduced and increases the weight of the scalers in that area. In the case of the gradient method, the method can be thought of as a rotation of the axis of the scaler. This means that the harmonics close to the edge of the pass band are also reduced, and allows a less extreme lowpass filter to be used. An interpretive scaler doesn't look closer to the original high resolution image because it is creating additional frequencies, it looks closer to the estimate because it has fewer harmonic of the lower resolution image or has more of the original low resolution frequency content. Both of which mean that the estimated high resolution image is closer to the true high resolution image. Again, higher accuracy results in faster convergence.

Further, using a scaler having high accuracy for the high resolution estimate has an impact in portions of the image when the super resolution process is unable to converge on the true high resolution image. The higher accuracy scaler results in these portions having fewer, if any, artifacts and therefore looks better.

Figure 3:
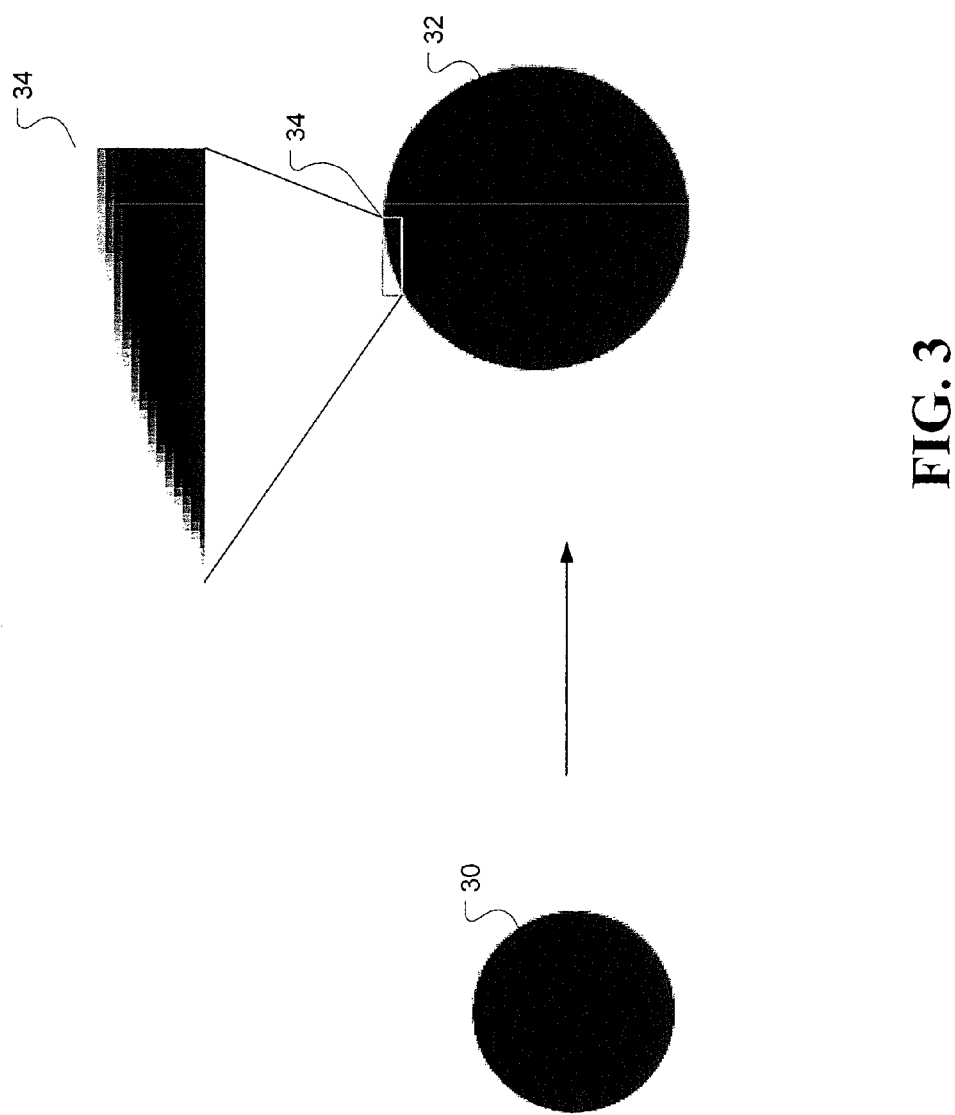
FIG. 3 shows an example of an image scaled using a non-adaptive scaling process.

FIG. 3 shows an example of a resulting high resolution output image from a super resolution process using a non-interpretive, or one-dimensional, filter. The input image is shown at 30. The resulting output image 32 looks very similar until one looks closer. For example, taking the portion of the image 34 and looking at it in exploded view, one can see edge artifacts. These stepping artifacts are typically known as 'jaggies.' The resulting high resolution image in this example has fairly noticeable jaggie artifacts.

Figure 4:
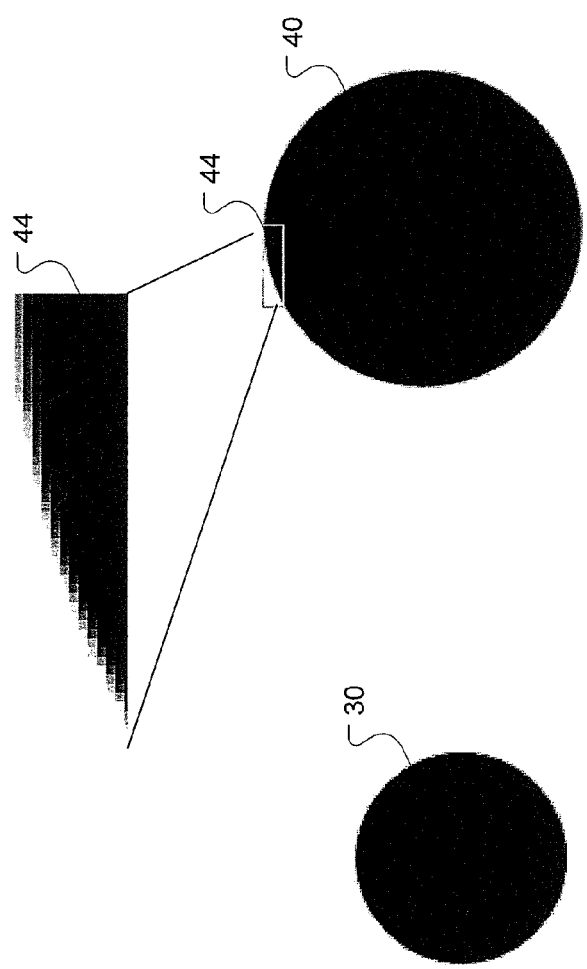
FIG. 4 shows an example of an image scaled using an adaptive scaling process.

FIG. 4 shows an example of a resulting high resolution output image from a super resolution process using an interpretive, or two-dimensional, filter. The input image 30 is the same as in FIG. 3. However, looking at the resulting high resolution image 40 and a portion 44 in an exploded view, one case see that there are still jaggie artifacts, but that they are reduced considerably from the artifacts from FIG. 3.

In this manner, one can develop a more accurate initial estimate of a high resolution image for use in a high resolution image. The better initial estimate results in a faster convergence, speeding up the super resolution process. In addition, as shown in FIGS. 3 and 4, the more accurate initial estimate results in better output.

This is especially true for still areas, uncovered areas in which an object moves to uncover an area that was behind it, and areas with complex motion, such as rotation and deformation. The motion estimation may not calculate these areas correctly. The low resolution frames in these areas typically do not contribute any information to the current frame. The final output is close to or even identical to the initial estimate because these types of motion are not captured by the motion estimate process.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of generating an initial high resolution frame, comprising:
   receiving at least two low resolution frames of an image at a processor, wherein the low resolution frames have a resolution lower than the high resolution frame;
   using one or more low resolution frames to interpolate a high resolution frame using an interpretive scaler, wherein the interpolation adapts to the contours of the image; and
   using the initial high resolution frame and at least two low resolution frames in an iterative super resolution process.

2. The method of claim 1, wherein using the interpretive scaler comprises using one of bandelet, kernel regression or gradient scaling.

3. The method of claim 1, wherein using the low resolution frame to interpolate a high resolution frame comprises using a gradient interpretive scaler to interpolate pixels on a high resolution grid along a direction estimated from local low resolution input pixels.

4. The method of claim 1, wherein the iterative super resolution process employs weighted blending.

5. A video post processor, comprising:
   an input port to receive image data from a video processor, the image data comprising at least two low resolution frames;
   an interpretive scaler arranged to receive the low resolution frames from the input port and an output port, the interpretive scaler to adapt to contours of the image data using local image data to a current pixel and produces an estimated high resolution image frame; and
   a super resolution processor to receive the estimated high resolution image frame and at least two low resolution frames, the super resolution processor to produce a high resolution frame.

6. The video post processor of claim 5, wherein the interpretive scaler comprises one of a bandelet scaler, a kernel regression scaler or a gradient scaler.

7. The video post processor of claim 5, wherein the interpretive scaler comprises a gradient scaler, and the processor adapts a kernel of the gradient scaler to use pixel values local to a current pixel.

8. A method of generating an initial high resolution frame, comprising:
  receiving at least two low resolution frames of an image at a processor, wherein the low resolution frames have a resolution lower than the high resolution frame;
  using one or more low resolution frames to interpolate a high resolution frame using a gradient interpretive scaler to interpolate pixels on a high resolution grid along a direction estimated from local low resolution input pixels, wherein the interpolation adapts to the contours of the image; and
  using the initial high resolution frame and the low resolution frame in an iterative super resolution process.

* * * * *